No. 834,444. PATENTED OCT. 30, 1906.
C. M. BAUSHER & A. C. MYERS.
WATER HEATER.
APPLICATION FILED DEC. 28, 1905.

Inventors
Charles M. Bausher.
Amos C. Myers.

Witnesses
Jos. J. Hosler.
M. F. Anthony

By Harry Frease
Attorney

UNITED STATES PATENT OFFICE.

CHARLES MONROE BAUSHER AND AMOS C. MYERS, OF GREENTOWN, OHIO.

WATER-HEATER.

No. 834,444.          Specification of Letters Patent.          Patented Oct. 30, 1906.

Application filed December 28, 1905. Serial No. 293,685.

*To all whom it may concern:*

Be it known that we, CHARLES MONROE BAUSHER and AMOS C. MYERS, citizens of the United States, residing at Greentown, in the county of Stark and State of Ohio, have invented new and useful Improvements in Water-Heaters, of which the following is a specification.

The invention relates to improvements in water-heaters; and an object of the invention is to provide a compact water-circulating and hot-water-generating system of large heating-surface in combination with a mode of handling the products of combustion to best develop and utilize the energy of the fuel in the creation of hot water; to secure the equal or desired distribution of the heating-gases and cause them to travel in close and constant contact with the heating-surfaces; to facilitate the circulation throughout the hot-water-generating system; to decrease the danger from accidents; to facilitate cleaning, repairs, and renewals, and to arrange baffles in a form best adapted for securing the most perfect combustion and utilization of the particular fuel employed, and generally to secure a high degree of economy and efficiency in the construction and operation.

A further object is to provide a more perfect combustion of the fuel employed and a more perfect utilization of the heat arising therefrom by means of a "fire basket or box" adapted to receive and contain the fuel and formed from a series of horizontal longitudinally-disposed water-tubes.

With these ends in view the invention consists in the novel construction, arrangement, and combination of parts hereinafter described, illustrated in the accompanying drawings, and particularly pointed out in the appended claims.

Figure 1:
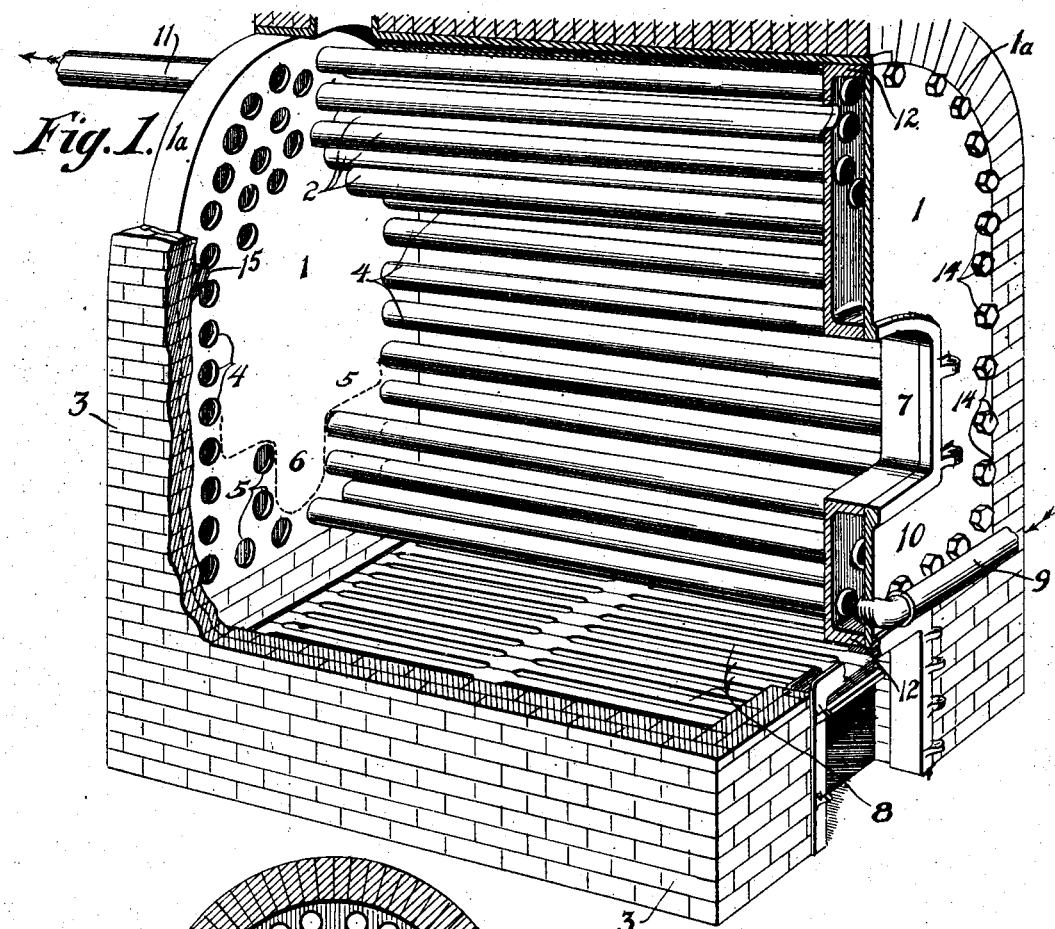
Figure 2:
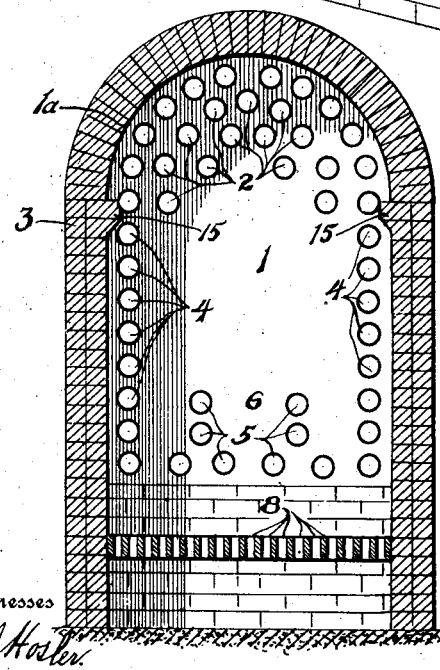
Figure 3:
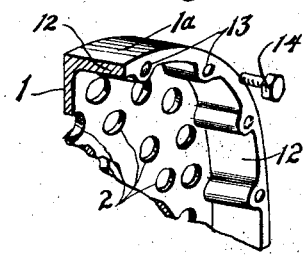

Referring to the accompanying drawings, forming a part of this specification, Figure 1 is a perspective view of the improved water-heater having a portion of its side and end walls broken away for the purpose of clearer illustration of the various features of construction; Fig. 2, a transverse sectional view of the same; Fig. 3, a detailed perspective view of a portion of one of the manifold ends.

Similar numerals of reference designate like parts throughout all the figures of the drawings.

The improved heater consists of the manifold ends 1, which form the front and rear walls of the respective ends of the heater, and a series of longitudinal horizontally-disposed tubes 2 are interposed between and connect the semicircular tops 1ª of the manifold ends 1 by having their ends entered and secured in corresponding openings in the inner wall of the manifolds 1.

The manifolds are preferably built or set within walls of masonry 3, forming the side and top walls of the furnace, and a second series of tubes 4 are arranged in a vertical bank and disposed between the manifolds in a similar manner to tubes 2, near the side edges of the manifolds and the inner surface of the side walls 3, above referred to.

A third series of tubes 5 are similarly interposed between and secured to the manifolds, but are arranged to form a substantially U-shaped longitudinally-extending fire basket or box 6 just beneath and in front of the door-opening 7 and having the upper edges thereof substantially in alinement with the sides of said door-opening. The fire basket or box 6, as the name implies, is adapted to receive the fuel and contain the same while being consumed. The tubes 5 form a grating extending longitudinally the entire length of furnace and are adapted to afford free and perfect combustion of the fuel, and at the same time fuel is economized by presenting the large heating-surface of the tubes in direct contact with the live coals of the fire contained therein, and the smaller consumed coals are permitted to fall through the tubes 5 upon the grate-bars 8 beneath.

A receiving-pipe 9 is suitably secured to the front wall 10 of the manifold-front, beneath the door-opening 7 thereof, and a discharge-pipe 11 is secured to the manifold-back near the upper portion thereof, as shown in Fig. 1 of the drawings.

The inner walls of the manifolds are provided with rims or flanges 12, provided with a series of openings 13, adapted to receive a series of bolts 14, (see Fig. 3,) passing through the outer walls of the same.

In order to turn or deflect the flames passing up between the inner sides of the side walls and the tubes 4, baffles or deflectors 15 are built out or formed with said side walls, whereby the flames are turned and directed against and between the horizontally-disposed tubes 2, interposed between the semicircular tops of the manifolds.

Having thus described our invention, without having attempted to set forth all the forms in which it may be made or all the modes of its use, we declare that what we claim, and desire to secure by Letters Patent, is—

1. A water-heater, consisting of manifolds forming the front and rear ends thereof and provided with semicircular tops, walls of masonry built about said manifolds to form the top and sides of the heater, a series of longitudinal horizontally-disposed tubes connected to and interposed between said semicircular tops of said manifolds, a second series of tubes connected to and interposed between said manifolds and arranged in vertical banks along the sides thereof, a third series of tubes interposed between said manifolds and arranged to form a substantially U-shaped longitudinally-extending fire-basket, and baffles formed with the side walls above said second series of tubes and adapted to direct the flames against and between said first-mentioned series of tubes.

2. In a water-heater, the combination of manifolds forming the front and rear walls thereof and provided with semicircular tops, walls built about said manifolds to form the top and sides of the heater, a series of horizontally-disposed tubes interposed between said semicircular tops and communicating with said manifolds, a second series of tubes communicating with said manifolds and arranged in vertical banks along the sides thereof, a third series of tubes communicating with said manifolds and arranged to form a substantially U-shaped longitudinally-extending fire-basket, and baffles formed with said side walls at the upper portion of said vertical banks of tubes.

3. In a water-heater, the combination of manifolds forming the front and rear walls thereof and provided with semicircular tops, walls built about said manifolds to form the top and sides of the heater, a series of longitudinally-disposed tubes interposed between said semicircular tops and communicating with said manifolds, a second series of tubes communicating with said manifolds and arranged in banks along the sides thereof, and a third series of tubes communicating with said manifolds and arranged to form a substantially U-shaped longitudinally-extending fire-basket.

In testimony whereof we have affixed our signatures in presence of two subscribing witnesses.

CHARLES MONROE BAUSHER.
AMOS C. MYERS.

Witnesses:
JOHN B. WITWER,
CHAS. S. WISE.